United States Patent Office 3,064,160
Patented Nov. 13, 1962

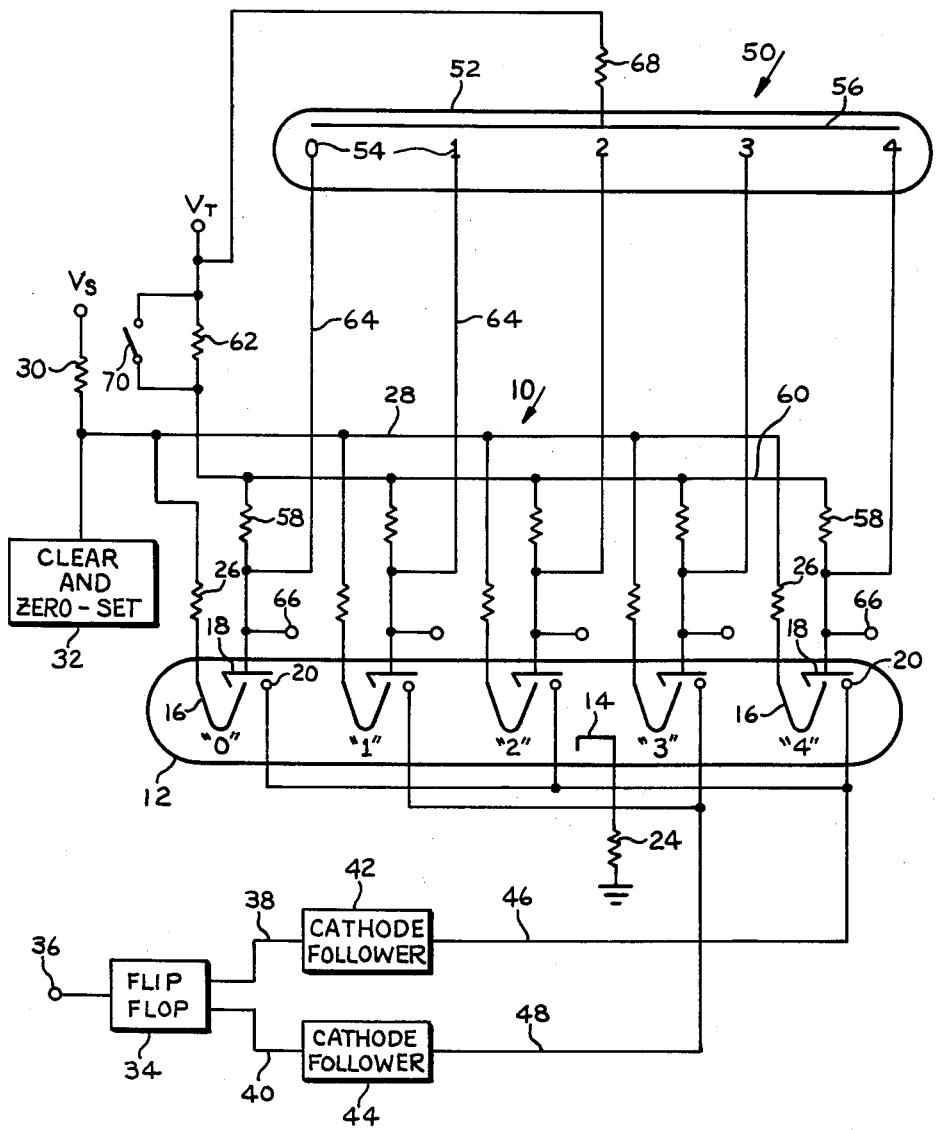
INVENTORS
DAVID GLASER
JOHN R. BETHKE
BY
Robert A. Green
ATTORNEY

3,064,160
COUNTER CIRCUIT AND OPTIONAL COUNT INDICATOR
David Glaser, Greenbrook, and John R. Bethke, Martinsville, N.J., assignors to Burroughs Corporation, Detroit, Mich., a corporation of Michigan
Filed July 2, 1959, Ser. No. 824,559
2 Claims. (Cl. 315—84.6)

This invention relates to counter circuits and particularly to counter circuits of the type which utilizes a counting means and a count indicating means associated therewith.

One type of counter circuit employs a multiple position magnetron beam switching tube coupled to an indicator device such as a multiple cathode glow indicator tube which provides a visual indication of the counting operation of the tube. Generally, this type of counter circuit performs satisfactorily. However, under some circumstances, for example, when the counting tube is operating at extremely high speed, the response time of the indicator tube may be exceeded and all of the cathodes may glow at the same time. Thus, a useful count indication is not provided. For applications of this type, it is desirable to be able to disconnect or disable the indicator device until a count indication is required, at which time the indicator is operatively coupled to the circuit and rendered operative. It is desirable that the decoupling and coupling operations be performed simply and efficiently.

Accordingly, the principles and objects of the invention are concerned with the provision of an improved circuit employing a multiple position counter tube and a count indicator device which may be coupled to and decoupled from the counter tube in simple and efficient manner without adversely affecting the normal operation and reliability of the counter tube.

In brief, the counter circuit of the invention includes an electron discharge device which is operable as a counting device and which is adapted to provide an output signal for each count executed. An indicator device is coupled to the counting device, and means are provided for coupling and for decoupling the indicator and counting devices. More specifically, the counting device is provided with an output circuit comprising a resistive network, across which the indicating device is connected. When current flows through the output circuit, the voltage across the output circuit is sufficient to cause the indicator device to operate. The auxiliary means comprises means for bypassing a portion of the output circuit and thereby reducing the voltage thereacross to such a level that the indicator device will not operate. The indicator device is thus coupled or decoupled without affecting the normal operation of the counter.

The invention is described in greater detail by reference to the single sheet of drawings wherein the single FIGURE is a schematic representation of a counter circuit embodying the invention.

The circuits and systems described below are particularly suitable for use with a multi-position type 6700 magnetron beam switching tube. In actual construction, this type of tube is cylindrical in form and is shown schematically in linear form as tube 10 in the drawing. The tube 10 includes an envelope 12 which contains a central longitudinally elongated cathode 14 and ten groups of electrodes spaced radially equidistantly from the cathode and surrounding the cathode. For simplicity, only five groups of electrodes are shown. Each group of electrodes includes a generally U-shaped elongated spade electrode 16 and a generally L-shaped target electrode 18 positioned so that each target occupies the space between adjacent spade electrodes. Each spade electrode serves to form and hold an electron beam on its corresponding target electrode. A generally rod-like switching electrode 20 is also included in each group of electrodes and is positioned between one edge of each target electrode and the adjacent spade electrode. The switching electrodes are known as switching grids. An open-ended cylindrical permanent magnet (not shown) is provided surrounding the tube envelope and coaxial therewith. The magnet provides an axial magnetic field which is utilized in conjunction with electric fields within the tube to form and switch an electron beam from the cathode to each of the groups of electrodes, in turn. The direction in which the beam switches, that is clockwise or counterclockwise, is always the same and is determined by the orientation of the electric and magnetic fields.

Briefly, in operation of tube 10, electrons emitted by the cathode are retained at the cathode if each of the spades, targets and switching grids carries its normal operating electrical potential. When a spade experiences a suitable lowering of its potential, an electron beam is formed and directed to the corresponding target electrode. The electron beam may be switched from one target electrode to the next by thus suitably altering the electrical potentials of a spade or switching grid. Under normal operating conditions, whenever electrode voltages are such that a beam might be supported at several positions, the beam will switch to the most leading position and lock in at this position.

In the circuit shown, the cathode 14 is connected through a suitable bias resistor 24 to ground. Each of the spade electrodes 16 is coupled through a spade load resistor 26 to a spade buss 28. The spade buss 28 is coupled through a common spade resistor 30 to a suitable positive D.C. power supply $V_s$. A suitable zero-set circuit 32 for clearing an electron beam in the tube and resetting it at the "0" position is coupled to the spade buss 28 and the spade electrode 16 at the "0" position. A typical zero-set circuit operates by first reducing the potential of the spade buss to a level at which a beam cannot be maintained at any position and then holding the "0" spade at a lower voltage level than the other spades until a beam forms at the "0" position.

The switching grid electrodes 20 are connected to suitable means for driving the tube 10 and thus switching an electron beam from position to position. In one arrangement, the grids at the even-numbered positions are connected together in one set, and the grids at the odd-numbered positions are connected together in another set. A flip-flop circuit 34 is provided having an input terminal 36 and having two output leads 38 and 40 which are connected to the inputs of cathode follower circuits 42 and 44. The cathode follower circuit 42 has its cathode output 46 connected to the even-numbered switching grids of the tube 10 and the cathode follower 44 has its cathode output 48 connected to the odd-numbered switching grids. As first one and then the other output of the flip-flop 34 operates through its cathode follower circuit, an electron beam is switched from position to position in the tube 10. If desired, the cathode followers may be omitted and the output leads of the flip-flop may be connected directly to the switching grids. However, the cathode followers provide low impedance and facilitate driving of the beam switching tube.

According to the invention, the tube 10 is coupled to an indicating device for indicating the counting operation of the tube. One type of indicating device contemplated by the present invention is a visual indicator such as the type 6844A tube 50. This type of tube, shown schematically, includes, in a gas-filled envelope 52, a plurality of indicator cathode glow electrodes 54 which are adapted to glow, and an anode electrode 56. According to the invention, each target electrode 18 is connected through a suitable load resistor 58 to a common target buss 60 which is coupled through a common resistor 62 to a positive D.C. power supply $V_T$. In addition, each target is connected by a lead 64 to one of the glow cathodes 54 of the indicator tube 50. Each target electrode may also be provided with an output terminal 66 which may be connected to any other suitable utilization circuit. The anode 56 of the indicator tube is connected through a current limiting resistor 68 to the power supply $V_T$.

The circuit of the invention also includes switch means adapted to couple together and to decouple the counter tube 10 and the indicator tube 50 so that the counter tube may be operated either with or without a visual indication of its counting performance. In the limited embodiment of the invention, the switch means is a simple mechanical switch 70 which is connected across the common target resistor 62. The switch means may also be an electronic device such as a tube or transistor.

In operation of the circuit of FIG. 1, if it is desired to couple the indicating device to the tube 10 so that a cathode glows and a visual indication of the count in the counting tube is obtained, then the switch 70 is held open and the common resistor 62 is thus in circuit with the target load resistors 58. With this arrangement, the flow of target current through the resistive load circuit, including a target resistor 58 and the resistor 62, provides a sufficient potential across the resistive network and across the indicator tube, to cause the appropriate cathode to glow. Usually, this visual indication is effected when the counting tube has reached a desired count and has stopped counting. If it is desired to operate the tube 10 with the indicator device decoupled from the circuit and not providing a visual indication of the counting operation of the tube, then the switch 70 is closed and, in effect, the common resistor 62 is bypassed and removed from the circuit. With the common resistor removed from the target circuit, current flow through any of the target load resistors produces a voltage drop across it and thus across the indicator tube, which is of insufficient magnitude to ignite the corresponding glow cathode in the indicator tube.

In one embodiment of the invention, the following circuit components were employed with type 6700 and 6844A tubes:

| | | |
|---|---|---|
| R26 | ohms | 150K |
| R58 | do | 18K |
| R62 | do | 18K |
| $V_s$ | volts | 210 |
| $V_T$ | do | 300 |

What is claimed is:

1. An electronic counting circuit including a multiple position electron discharge device having a plurality of groups of electrodes, each group of electrodes including an output electrode from which an output signal may be obtained, a resistive current flow path connected to each said output electrode for supplying operating current thereto, an electronic indicator device having an anode and a plurality of glow cathodes each of which glows when a suitable potential is connected between it and said anode, said output electrodes of said electron discharge device being directly connected each to one of said glow cathodes, said output electrodes also being connected through said resistive current flow path to said anode, the resistance of said current flow path being such that normal operating current flow to an output electrode through said current flow path causes sufficient voltage to be applied between said anode and the corresponding glow cathode so that the cathode glows, and a single means for changing the resistance of said current flow path so that normal operating current flow to an output electrode through said current flow path causes a voltage to be applied between said anode and the corresponding glow cathode which is of insufficient magnitude to cause the cathode to glow.

2. The circuit defined in claim 1 wherein said last-named means comprises a bypass switch for bypassing and thus effectively removing a portion of the resistance from said resistive current flow path.

References Cited in the file of this patent

UNITED STATES PATENTS

| | | |
|---|---|---|
| 2,292,064 | Dorgelo et al. | Aug. 4, 1942 |
| 2,774,915 | Gusman et al. | Dec. 8, 1956 |
| 2,906,906 | McCauley et al. | Sept. 29, 1959 |
| 2,906,915 | Wolfe | Sept. 29, 1959 |
| 2,922,576 | Winfield | Jan. 26, 1960 |
| 2,954,507 | Kitz et al. | Sept. 27, 1960 |